United States Patent
Zick et al.

(10) Patent No.: US 6,370,504 B1
(45) Date of Patent: Apr. 9, 2002

(54) SPEECH RECOGNITION ON MPEG/AUDIO ENCODED FILES

(75) Inventors: Gregory L. Zick, Kirkland; Lawrence Yapp, Federal Way, both of WA (US)

(73) Assignee: University of Washington, Seattle, WA (US)

( * ) Notice: Subject to any disclaimer, the term of this patent is extended or adjusted under 35 U.S.C. 154(b) by 0 days.

(21) Appl. No.: 09/083,361

(22) Filed: May 22, 1998

Related U.S. Application Data

(60) Provisional application No. 60/047,858, filed on May 29, 1997.

(51) Int. Cl.[7] .......................... G10L 15/02; G10L 15/14
(52) U.S. Cl. ..................... 704/251; 704/200.1; 704/256
(58) Field of Search ................................ 704/500, 501, 704/502, 503, 504, 229, 200, 201, 256, 255, 205, 206, 219, 200.1, 230, 251, 231, 246, 250

(56) References Cited

U.S. PATENT DOCUMENTS

| | | | | |
|---|---|---|---|---|
| 4,866,777 A | * | 9/1989 | Mulla et al. ................ | 395/2.15 |
| 5,305,422 A | * | 4/1994 | Junqua ....................... | 395/2.62 |
| 6,003,004 A | * | 12/1999 | Hershkovits et al. ....... | 704/253 |

OTHER PUBLICATIONS

Proceedings., IEEE International Conference on Multimedia Computing and Systems '97. Yapp et al., "Speech REcognition on MPEG/Audio encoded files", pp624–625. Jun. 3–6, 1997.*

* cited by examiner

*Primary Examiner*—Richemond Dorvil
(74) *Attorney, Agent, or Firm*—Ronald M. Anderson

(57) ABSTRACT

A technique to perform speech recognition directly from audio files compressed using the MPEG/Audio coding standard. The technique works in the compressed domain and does not require the MPEG/Audio file to be decompressed. Only the encoded subband signals are extracted and processed for training and recognition. The underlying speech recognition engine is based on the Hidden Markov model. The technique is applicable to layers I and II of MPEG/Audio and training under one layer can be used to recognize the other.

26 Claims, 6 Drawing Sheets

SPEECH RECOGNITION ON MPEG/AUDIO ENCODED FILES

This application is based on prior copending provisional application Ser. No. 60/047,858, filed May 29, 1997, the benefit of the filing date of which is hereby claimed under 35 U.S.C. §119(e).

FIELD OF THE INVENTION

This invention generally relates to indexing files, and more specifically, pertains to the use of speech recognition of MPEG/Audio encoded files to permit indexing the files in regard to content.

BACKGROUND OF THE INVENTION

The Motion Picture Experts Group (MPEG) set of standards have become an enabling technology for many of today's multimedia applications. MPEG encoded video facilitates the transmission of movies and other multimedia works over networks and the efficient storage of video data in a digital library. As video libraries for storing multimedia works become common and grow in size, the need to automatically and consistently index the content of videos becomes increasingly more important. A video that has been richly indexed can open a host of new applications. For example, knowing the location in a video where a favorite actor speaks or where a keyword is spoken can enable a variety of large scale implementations of hyperlinked video and facilitate new training and educational programs.

An audio track accompanying a video contains an enormous amount of information, some of which can be inferred by the human listener. For example, by listening to the audio portion independent of the video action, in addition to understanding what is being said, humans can infer who is doing the talking. Other types of information that can be inferred are gender of the speaker, language, emotion, and the style of the video material, e.g., dramatic or comedic. Therefore, a great opportunity lies in the automatic extraction of these audio elements so that they can be used as indices in framing queries and in effecting the retrieval of associated video segments.

There have been a great number of publications on work related to video indexing. The majority are focused on scene cuts and camera operations such as pan and zoom. Knowing only where a scene cut is or when a camera movement occurs in a video is not enough to develop a usable index of the video based on content. The practical application of indexing, particularly for non-professional applications, requires more content than has been provided by the prior art. Clearly, it is more likely that a home video user will employ an index to access a particular type of program in a video library rather than to locate a particular kind of camera shot.

Complete, general, and unrestricted automatic video indexing based on the analysis of the accompanying audio may not be possible for some time. Nevertheless, with restrictions, successful application of current speech recognition technology can be applied to automatic video indexing for domain specific applications. For example, in a sports video of a football game, a small set of keywords can be used and recorded onto the audio track to describe plays and formations such as "fake punt" and "I-32 wide right." Being able to recognize these connected words in the accompanying audio can lead to a very useful index that allows a football coach to select desired plays and go directly to the associated video segment during a training session or analysis of the game recorded on the video.

From the foregoing discussion, it will be apparent that a technique capable of recognizing continuously uttered words in compressed MPEG/Audio for use as indices would be a valuable tool. Working in the compressed domain has a number of benefits. It saves computation time, since decompression is not necessary, and it saves disk space, since no intermediate file is created (e.g., as would be required if the audio track on the MPEG files had to be decompressed first).

There is not much published work on the direct analysis of the audio accompanying video material for speech recognition in video indexing. A system has been described to determine voiced, unvoiced, and silent classification directly on MPEG/Audio, and various time domain speech analysis techniques such as the short-time energy function for endpoint detection have been described in the prior art. These initial efforts contributed to simple video indexing based on audio, but the extracted information has been limited to the characteristics of the audio signal and not its content. However, just knowing where voicing and silence occurs is not enough. Additional information is needed in order to be useful for content-based video indices.

If the video contains a closed-captioned signal, an index can be readily made from the words extracted from the signal. A prior art system that makes use of this technique uses closed-captioned signal to generate pictorial transcripts of the video. Unfortunately, there is a problem with the limited amount of video material that comes with closed-captioning. In another prior art system, the Sphinx-II speech recognition system has been applied to a closed-captioned signal. However, when closed captioning was not available in this system, speech recognition was used exclusively. The reported word error rate ranged from ~8–12% for speech benchmark evaluation to ~85% for commercials.

Recently, an integrated approach of using image and speech analysis for video indexing has been described in the art. The video and audio are separated, with video encoded into AVI and audio into WAV files. A speech recognition system based on template matching was used in this system. However, using template matching for speech recognition is crude, as it has problems dealing with the variability that exists in speech.

Unlike the prior art described above, it would be preferable to derive speech features for recognition from the compressed MPEG/Audio domain, and to extract higher level indices that go beyond the characteristics of the audio signal by applying speech recognition. Accuracy of the process should be enhanced by using a robust technique and by restricting the scope for recognition to specific applications (i.e., not for general speech recognition).

SUMMARY OF THE INVENTION

It will be understood that MPEG-1 was used in developing the present invention, and as used throughout this description, the term "MPEG/Audio" will mean MPEG-1 and MPEG-2/Audio.) The underlying speech recognizer employed in a preferred form of the invention is based on the Hidden Markov model. Decompression is not required, as training and recognition is performed based on the extracted subbands of the MPEG/Audio files.

In accord with the present invention, a method is defined for recognizing speech in an MPEG file. The method includes the step of determining speech features of the MPEG file without first decompressing the MPEG file. Using the speech features, a speech recognition model is trained to recognize words in a different MPEG file. The speech recognition model is then employed to recognize words spoken in an audio portion of the different MPEG file, also without first decompressing that MPEG file.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Overview

Figure 7A:
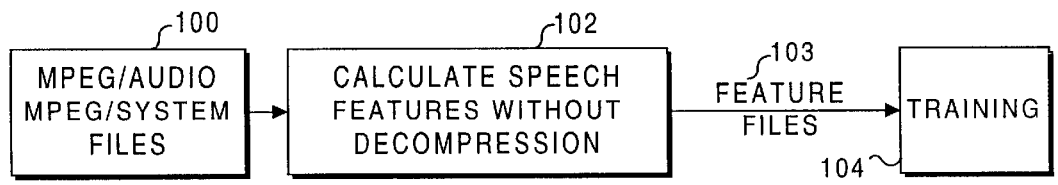
FIG. 7A is an overview block diagram showing the functional blocks employed by the present invention for training.
Figure 7B:
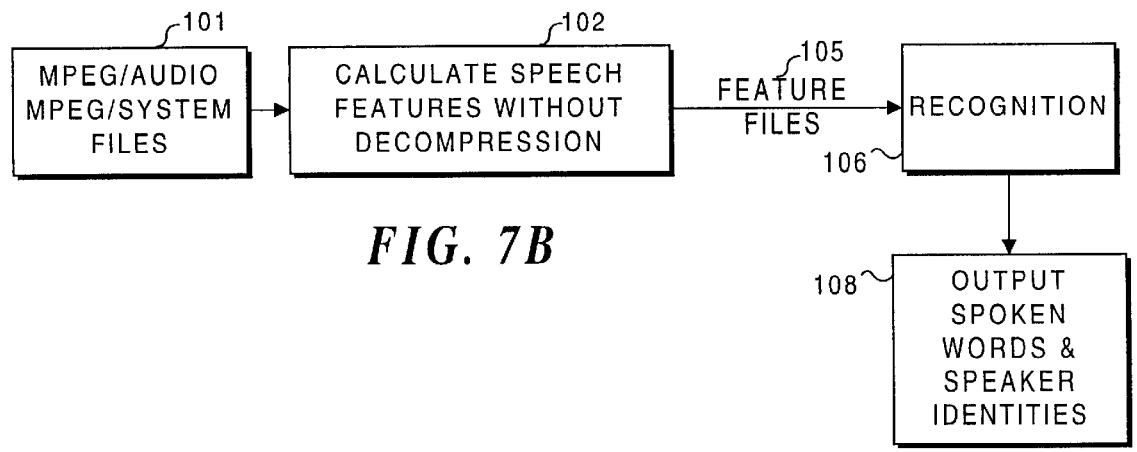
FIG. 7B is an overview block diagram showing the functional blocks employed by the present invention for recognition.

A fundamental concept implemented in a preferred embodiment of the present invention is to take advantage of work that has gone into encoding raw PCM files into MPEG/Audio files. As illustrated in blocks 100, 102, and 104 of FIG. 7A, the training phase of speech recognition of MPEG/Audio files using speech features in feature files 103 can be achieved without decompression of the MPEG/Audio and MPEG/System files. Similarly, the recognition of speech as indicated in a block 106 of FIG. 7B, using feature files 105 can be done without decompression of MPEG/Audio or MPEG/System files 101, yielding an output of spoken words and enabling speaker identification, as indicated in a block 108. There is no need for decompression of MPEG files if speech features that are needed for speech recognition can be derived from the extracted information included in MPEG/Audio files. Once the speech features have been derived, they are first used to train Hidden Markov models that are then used to recognize speech features from unknown MPEG/Audio files 101.

MPEG/Audio

Figure 1:
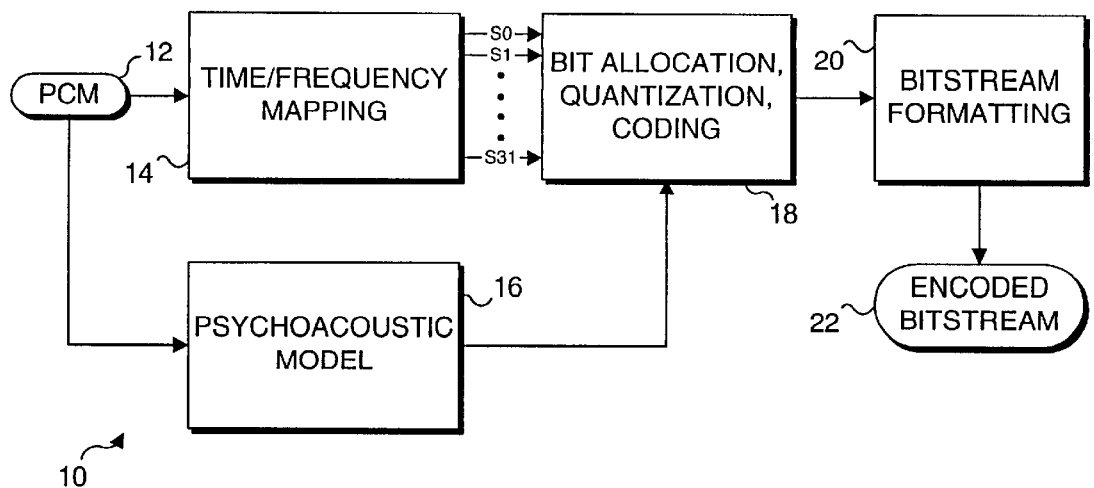
FIG. 1 (Prior Art) is a schematic block diagram illustrating the functional block employed for MPEGT/audio coding.

The definition of MPEG/Audio can be found in the International Standard ISO/IEC Specification 11172-3, and papers describing it in detail are readily available. A block diagram 10 of the MPEG/Audio coding scheme is shown in FIG. 1. As shown therein, a signal conveying data from a PCM file 12 is input to a filter bank 14 that implements a time/frequency mapping, and also to a psychoacoustic model 16. Unlike speech-specific coders, MPEG/Audio does not assume anything about the source. Psychoacoustically unimportant information are thrown out or are coded with less bits by the psychoacoustic model. While the compression is lossy, perceptually, the decompressed signal is the same, even at six-to-one compression.

There are three different layers that can be used for the encoding process illustrated in FIG. 1; however, common to all is filter bank 14 that performs the time/frequency mapping of the signal into 32 equal-width subbands. A 512-sample moving window is used in the analysis and operates on 32 samples at a time. In a block 18, bit allocation, quantization, and coding are implemented. The output of each subband is decimated by 32 so that the number of output samples equal the number of input samples for each time unit. The output of the subbands are coded in block 18, based on the information received from either one of two psychoacoustic models 16. The output of each subband can be described with the following equations:

$$s_t[i] = \sum_{n=0}^{511} x[t-n] \times H_i[n] \quad (1)$$

where $s_t[i]$ is the output of the $i^{th}$ subband at time t, x[t] is the audio sample at time t, and $H_i[n]$ is defined as:

$$H_i[n] = h[n] \times \cos\left\{\frac{(2 \times i + 1)(n - 16)\pi}{64}\right\} \quad (2)$$

where h[n] is a prototype lowpass filter. In this form, it is evident that each subband has its own bandpass filter as a result of the cosine term shifting the lowpass response h[n] to the appropriate frequency band. The center frequency for each of the subband filters is at odd multiples of $$\frac{\pi}{64T},$$

where T is the sampling period and the bandwidth of each filter is $$\frac{\pi}{32T}.$$

A problem with the filters is that they are not sharp and aliasing can occur between adjacent subbands. For example, a signal at a single frequency can have effect on two subbands, which can then affect compression performance. The bitstream formatting in a block 20 involves decompression to resynthesize the subband samples back into PCM using interpolation and requires complicated filters to remove the aliasing. The output is an encoded bitstream 20.

Hidden Markov Models

There are many techniques that have been used for speech recognition. Of all the techniques, Hidden Markov models (HMMs) have to date yielded the best performance of all the techniques, since they are best at capturing and modeling the variability in speech. HMMs can represent events that have statistics that change over time, and this characteristic is particularly important for speech recognition, since it can account for variations in speech (i.e., speaking slowly and quickly).

Another advantage of HMMs is that the training data does not need to be labeled since word or phone boundaries are automatically absorbed into the model during training. The parameters of the HMMs can be determined entirely by computation, thus making them relatively easy to train. HMMs can be used for isolated as well as continuous word recognition, and they can be used to model at the subword, word, or even sentence levels. The HMM approach is very different from template matching and dynamic time warping techniques, which try to code temporal and speaker variations in a brute-force way.

Features Derived from MPEG/Audio for Speech Recognition

One way to perform speech recognition is to use a filter bank analysis. The raw PCM samples are broken up into short overlapping analysis segments that are used to compute the corresponding speech vector for training and recognition. The frequency content of each segment is determined by using a fast Fourier transform (FFT) as part of the process. In MPEG/Audio, the original audio has already been mapped into the frequency domain through the different subbands. The lower subbands contain low frequencies and the higher subbands contain higher frequencies. Unfortunately, synthesizing an exact copy of the FFT for the small overlapping segments in the original audio from the subband signals is complicated. However, a reasonable speech feature can be derived for both training and recognition by using only the subband signals.

Figure 2:
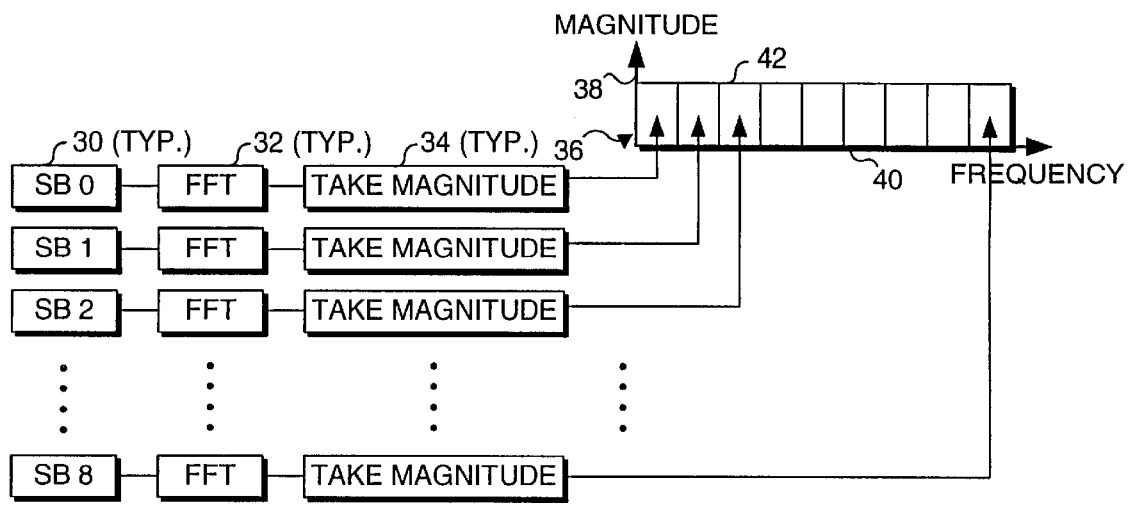
FIG. 2 (Prior Art) is a functional block diagram showing the concatenation of the magnitude of a fast Fourier transform (FFT) signal to map the signal into the frequency axis.

An approach used in the present invention is to take the magnitude 34 of an FFT 32 of each subband 30 and construct an overall vector by concatenating each magnitude, generally as shown in FIG. 2. For purposes of illustration, it is assumed that the original audio was sampled at 32 kHz. Therefore, each subband 30 has a bandwidth of 500 Hz. Assuming that most human speech lies below 4.5 kHz, only subbands zero to eight need be considered. Note that the subbands that are considered can vary depending on the assumptions made. Taking magnitude 34 of FFTs 32 and concatenating them (mapping them into a frequency axis 40) amounts to shifting magnitudes 38 into appropriate frequency values 42 for the corresponding subband as shown in the graph portion of FIG. 2.

In computing the speech vectors to be used for training and recognition in an exemplary application of the present invention, a 25 ms analysis window was used, with 15 ms overlap between windows. At 32 kHz, this approach yielded 800 samples for the analysis window. Since the subband signals are decimated by 32, the number of samples dropped to 25 for each subband.

FIGS. 8A through 8D shows the logical steps of the process. Following a Start block in FIG. 8A, the logic begins with a block 110, in which an MPEG/Audio file encoded using layers I or II is input for processing. A block 112 provides that subband samples are extracted from the MPEG/Audio files. In the example, the subband samples are framed into 25-sample windows for all of the m subbands in a step 114, where the variable m is equal to nine. This processing step is repeated until there are no more subband samples.

Figure 8A:
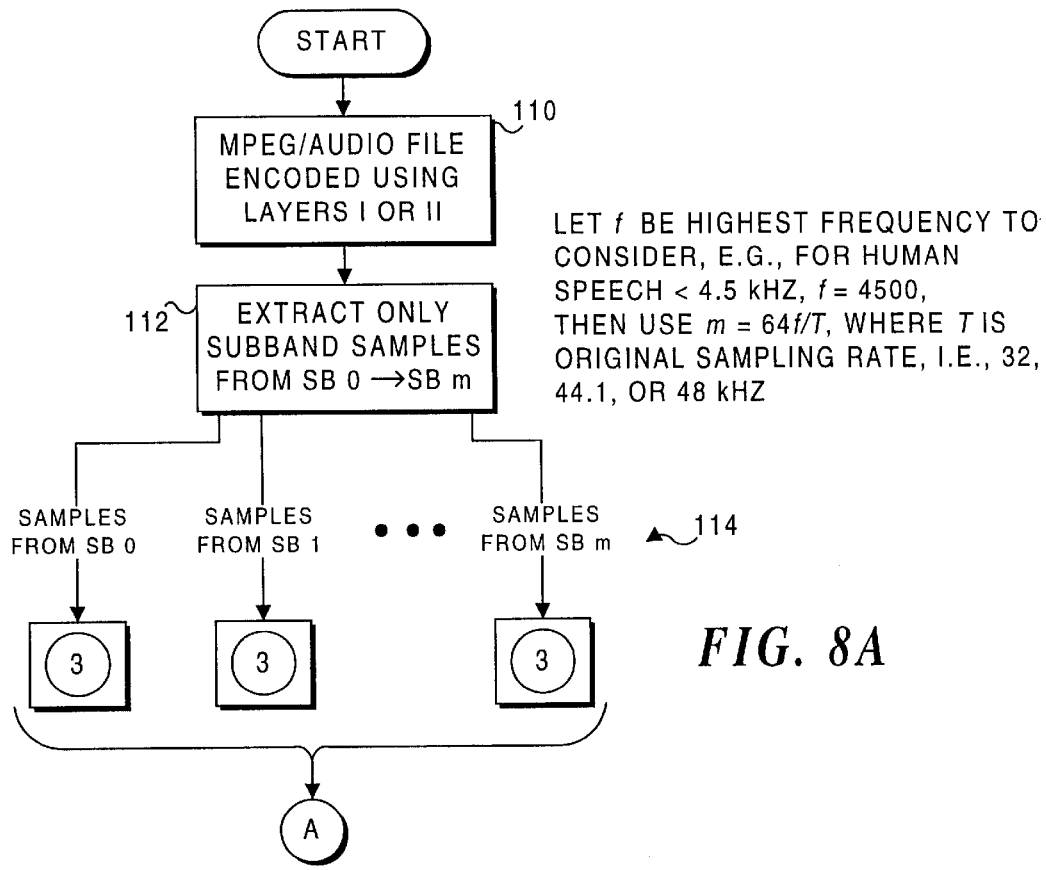
FIGS. 8A–8D are a flow chart showing the details of the logic employed in the present invention.
Figure 8B:
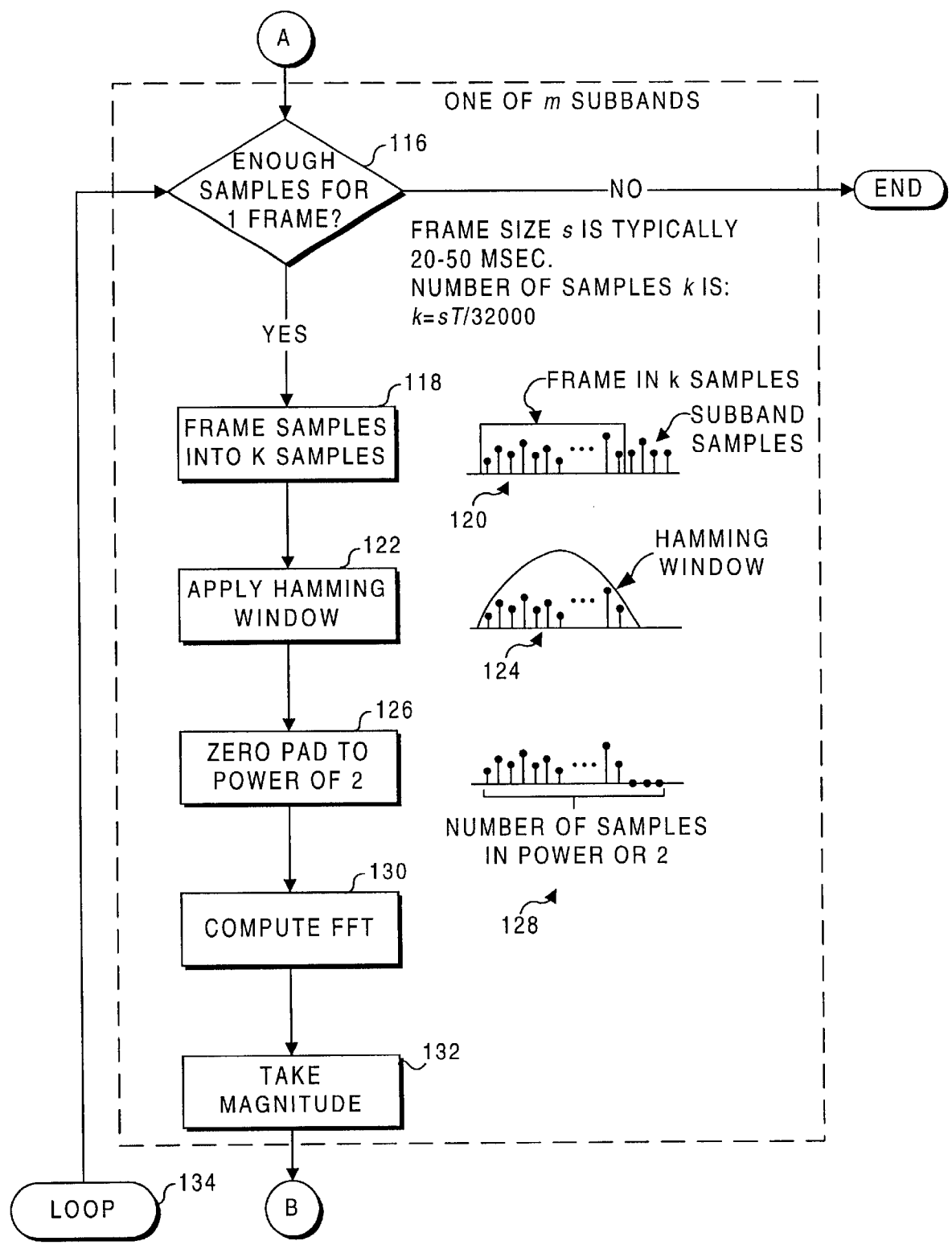
Figure 8C:
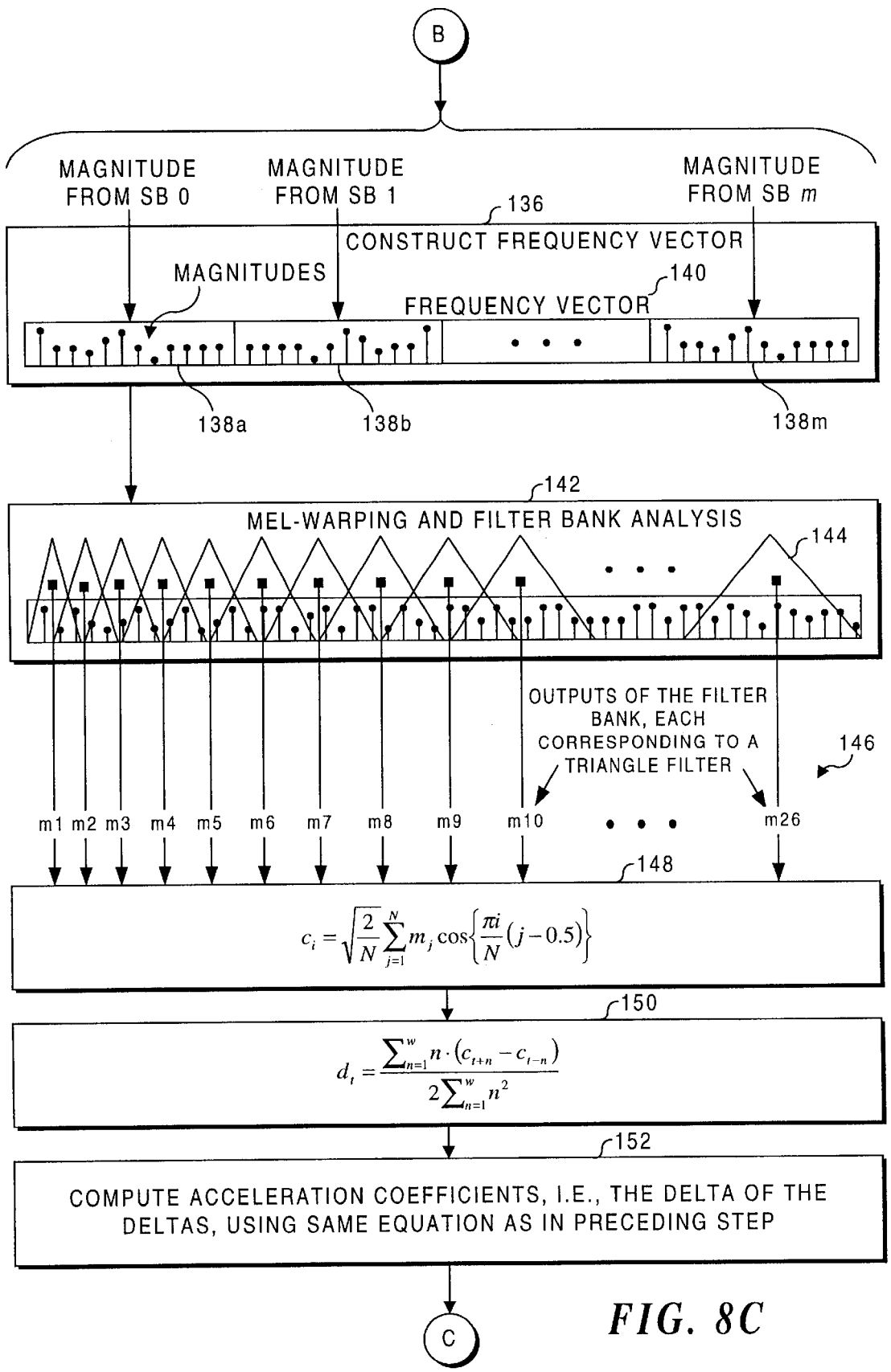
Figure 8D:
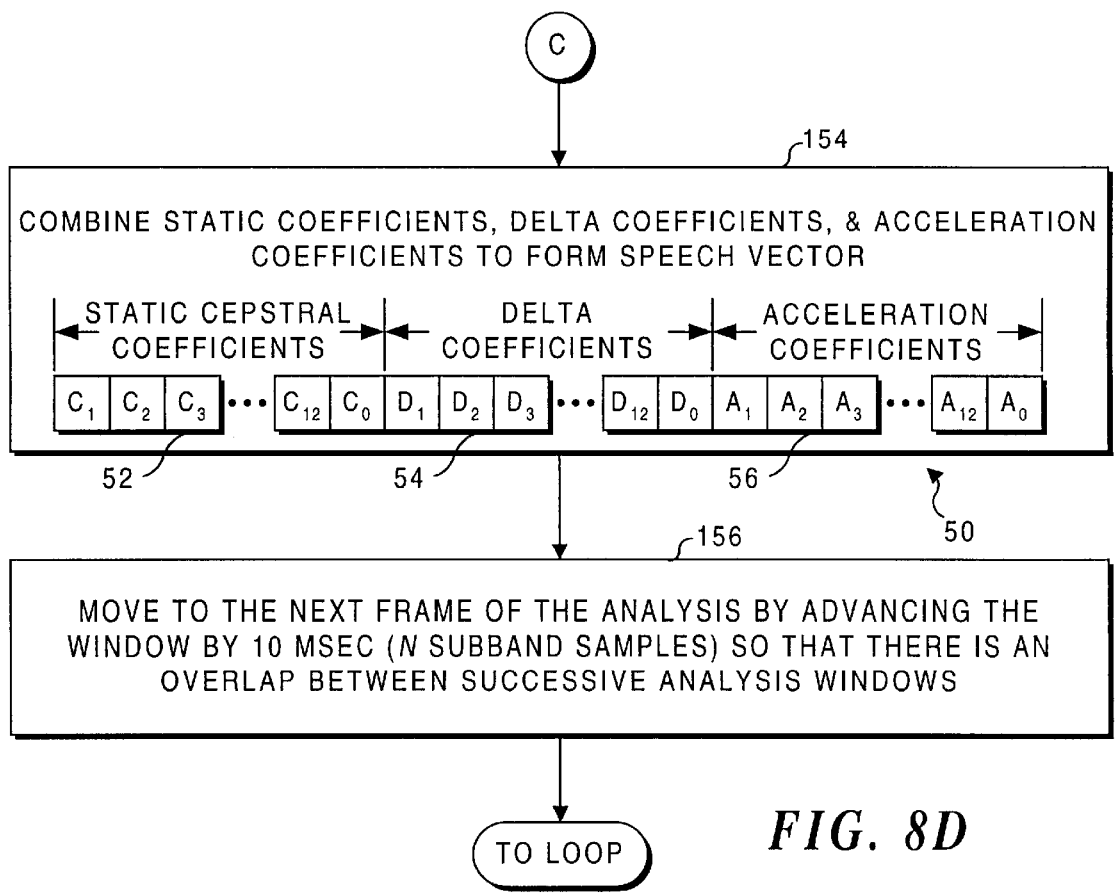

FIG. 8B shows the steps that are applied to one of the m subbands. A decision block 116 determines if enough samples have been obtained for one frame. If not, the process is concluded and terminates. However, if the response to decision block 116 is affirmative, the logic continues with a block 118 in which the samples are framed in k samples. The frame size s is typically 20–50 msec. and the number of samples k in the frame is defined as indicated in the text and as illustrated at 120 in the Figure. In each subband analysis as noted in a block 122, the samples are windowed using a Hamming window 124 to counter the edge effects. In a block 126, the samples are then zero padded to a power of 2, as illustrated at 128, to compute the FFT, as provided in a block 130. Finally, in a block 132, the magnitude is taken, and as shown in a block 136 in FIG. 8C, the magnitudes $138a$, $138b$, . . . $138m$ of the various subbands are concatenated into a single frequency vector 140. Once mapped into the frequency axis, this frequency vector gives a reasonable starting point for derivation of the speech vectors.

At this point, the processing follows established filterbank analysis procedure. In a block 142, the frequency vector is mel-warped into a mel-scale that is defined by the equation:

$$Mel(f) = 2595 \log_{10}\left(1 + \frac{f}{100}\right) \quad (3)$$

where f is frequency. The warping is achieved by multiplying the magnitudes in the frequency vector (i.e., in the corresponding frequency axis) with triangular filters 144 corresponding to the mel-scale. In this example, 26 triangular filters 144 were used, and they correspond to the outputs of the filter bank, as indicated at 146. Next, in a block 148, cepstral coefficients are computed from the output of the filter bank using the discrete cosine transform:

$$c_i = \sqrt{\frac{2}{N}} \sum_{j=1}^{N} m_j \cos\left\{\frac{\pi i}{N}(j - 0.5)\right\} \quad (4)$$

where i is the $i^{th}$ cepstral coefficient and N is the number of filter bank channels. Twelve cepstral coefficients plus the zeroth $c_0$ cepstral coefficient (the energy component) were computed in the example. These thirteen coefficients make up the so-called static coefficients. Better performance can be gained by adding time derivatives to the basic static coefficients. The delta coefficients are computed from the static coefficients, as indicated in a block 150, using the following regression formula:

$$d_t = \frac{\sum_{n=1}^{w} n \cdot (c_{t+n} - c_{t-n})}{2 \sum_{n=1}^{w} n^2} \quad (5)$$

where $d_t$ is the delta coefficient at time t and w is set to two for the number of delta windows.

When the preceding formula is used at the beginning of this step, the static coefficients of the first speech vector is used for $c_{t-1}$ and $c_{t-2}$ and similarly for the end. Also, as noted in a block 152, the acceleration coefficients are computed, that is, the delta of the deltas and Equation 5 is applied to the deltas to obtain the acceleration coefficients.

Figure 3:
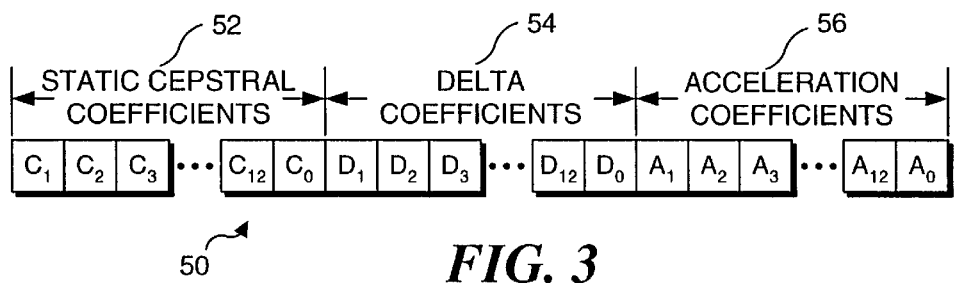
FIG. 3 is a schematic block diagram showing a speech vector derived from nine subbands using an analysis in accord with the present invention.
Figure 9:
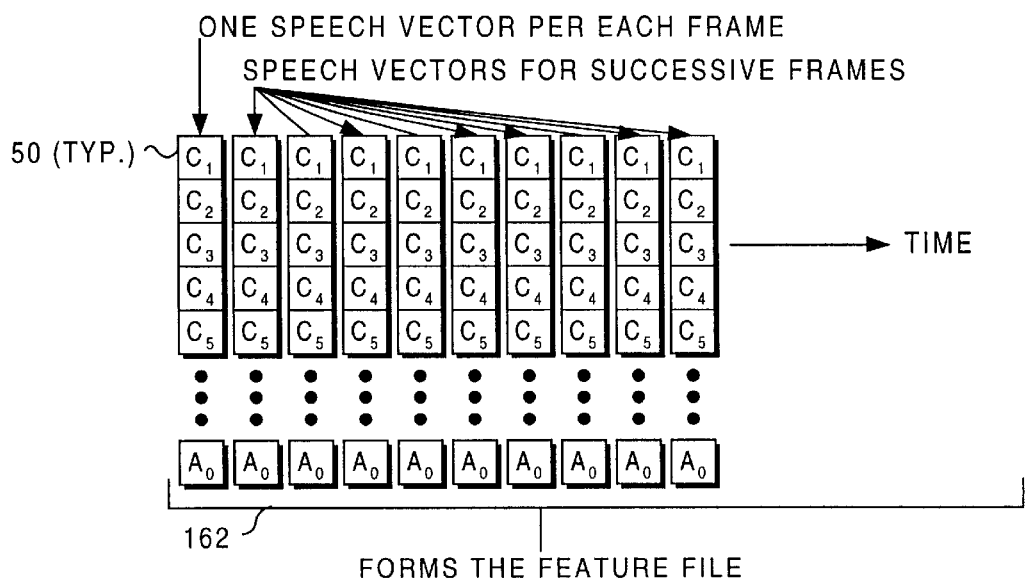
FIG. 9 is a block diagram illustrating how speech vectors comprising successive frames form a feature file.

As shown in FIG. 3, a total of 39 coefficients are generated for each speech vector. These coefficients are broken down into thirteen static coefficients 52, thirteen delta coefficients 54, and thirteen acceleration coefficients 56. Note that in a block 154 of FIG. 8D, there is only one speech vector 50 that is computed for all nine subbands per analysis. The resulting speech vectors 50 for each frame, which were derived from the MPEG/Audio files, comprise a feature file 162, as illustrated in FIG. 9. These speech vectors are input into the HMM for both training and recognition, as described in greater detail below.

Training Recognition, and Results

The HMM-based speech recognizer that was used in the preferred embodiment of the present invention was the HTK package obtained from Entropic Cambridge Research Laboratory. To train the HMM, a grammar of the allowed sentences is first created. The test grammar is a simple "telephone dialer" that consist of digits, proper names, and some verbs, giving a total of 17 unique words. Some examples of valid sentences are "DIAL SIX SEVEN TWO ONE" and "CALL JILL". For training, one speaker recorded 200 continuously spoken sentences that were randomly generated from the grammar, giving a total of 1,122 words for the set.

Similarly for recognition, 300 sentences spoken continuously with different styles (e.g., quickly, slowly) were recorded by the same speaker, giving a total of 2,018 words for the set (see Table 1). Most of the sentences in the training set are not found in the recognition set and vice versa. Once recorded, the PCM files are converted into MPEG/Audio layers I and II.

TABLE 1

Training and Recognition Sets (Recorded by One Speaker)

| Set | Sentences | Words | Speaking Style |
|---|---|---|---|
| Training | 200 | 1,122 | Continuously |
| Recognition | 300 | 2,108 | Continuously (Fast and Slow) |

Experiment Overview

The training set was recorded at a different time than the recognition set. The sentences were sampled at 32 kHz, mono, into 16-bit PCM files using the built-in audio facility on an HP 9000/C110 computer. The amount of compression in MPEG/Audio can be tuned by encoding the files into one of several different output bit rates. For high compression, a low bit rate can be used, and similarly, for low compression, a high bit rate can be used.

For training, the PCM files are converted into MPEG/Audio layers I and II files at various output bit rates. A program using the technique described above was used to read the MPEG/Audio files and generate the corresponding speech vectors that was used to train the recognizer. For recognition, the recognition set is converted into MPEG/Audio layers I and II, also at various output bit rates. The MPEG/Audio files are read and the corresponding derived speech vectors are fed into the recognizer for recognition. The recognizer has facilities to determine the accuracy of each run, and these numbers are used for the measurement.

Training the HMM

Once the grammar has been created, a pronunciation dictionary is used to break up each word into its individual sub-word monophones. For example, the word CALL is broken into three monophones: k, ao, l, which when uttered in sequence, will produce the sound for the entire word. No segmentation or labeling of the utterances was necessary during training or recognition.

Each monophone is assigned an HMM that will be trained. The topology of the HMMs is a simple three-state, with a short pause model added to the center. In the process, the monophones are eventually converted into tied-state triphones. In each step, several invocations of parameter re-estimation are done until the final models are complete and ready for use for recognition. Complete details on training of the HMMs can be found in the HTK manual.

Training and Recognizing from MPEG/Audio

Figure 4:
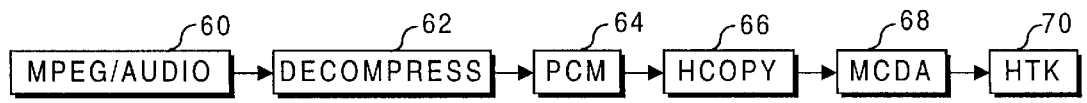
FIG. 4 (prior art) is a block diagram showing a typical procedure for "training" that requires decompression of the MPEG/Audio signal.

A typical prior art training procedure that requires decompression of MPEG/Audio files is illustrated in FIG. 4. Each MPEG/Audio file 60 must first be decompressed into PCM 64 in a block 62, then HTK's HCopy tool 66 is used to compute the corresponding feature file. The feature file consists of a sequence of speech vectors of mel-warped cepstral, delta, and acceleration coefficients (MCDA) files 68. Once generated, the MCDA files are used by HTK 70 to estimate the parameters for the HMM models.

Figure 5:
FIG. 5 is a block diagram showing, in contrast to FIG. 4, that the present invention does not require decompression of the MPEG/Audio signal.

However, using the technique of the present invention 72, as described above, the steps required for training reduces to those shown in FIG. 5. An intermediate PCM file 64 is not necessary. Instead, the subband signals are extracted directly from MPEG/Audio files 60 and are used to compute the MCDA files 68. Note that for the same MPEG/Audio file, the MCDA file from FIG. 4 is not the same as the MCDA file from FIG. 5. For recognition, the exact same procedure shown in FIG. 5 is used since HTK can be used to recognize MCDA files. Using HTK's HVite and HResults tools, the accuracy of the recognition can be determined. The sentences used to test for recognition accuracy are also taken from the "recognition set" (see Table 1).

Results

For comparison, raw PCM versions of the sets in Table 1 were used for training and recognition. The best result that was obtained is shown in Table 2, where a 99.65% accuracy was achieved. Here, accuracy is defined as:

$$\text{Accuracy} = \frac{\text{Words} - \text{Deletion} - \text{Substitution} - \text{Insertion}}{\text{Words}} \times 100\% \quad (6)$$

TABLE 2

Results Using Raw PCM for Both Training and Recognition

| Accuracy | Words | Deletion | Substitution | Insertion |
|---|---|---|---|---|
| 99.65 | 2,018 | 5 | 0 | 2 |

In Table 2, the Words column refers to the total number of words, Deletion refers to the number of incorrect deletions, Substitution refers to the number of incorrect substitutions, and Insertion refers to the number of incorrect insertions. Thus, all results obtained will follow the procedure shown in FIG. 5.

Results Using Different Output Bit Rates

Figure 6:
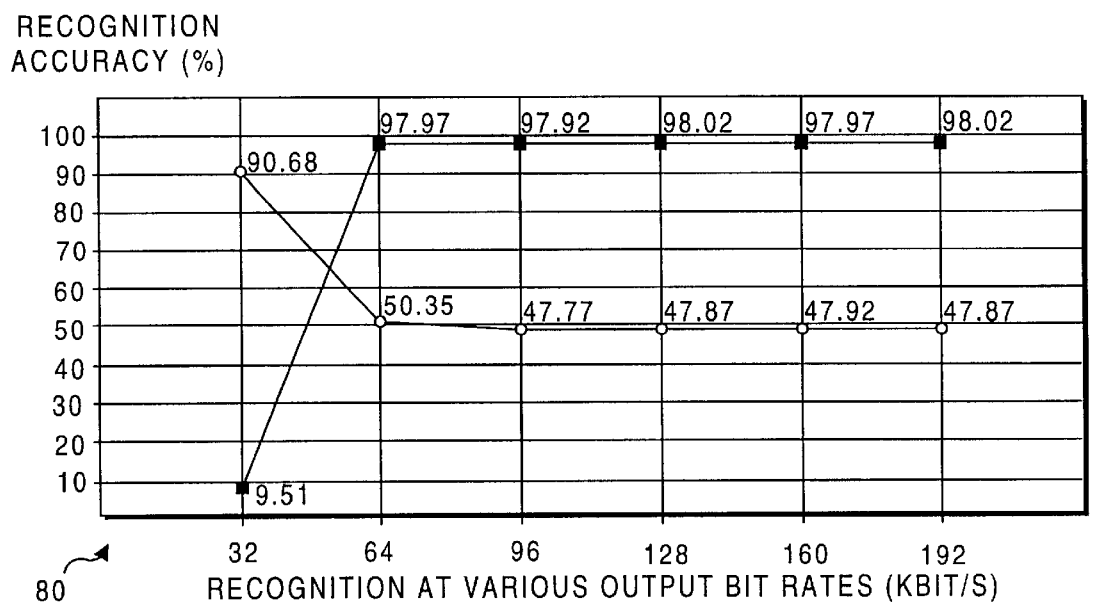
FIG. 6 is a graph of accuracy of recognition at various bit rates, where training occurred at two different bit rates.

The accuracy resulting from training using one output bit rate of MPEG/Audio layer I files and recognition at various output bit rates is shown in Table 3. The plot in FIG. 6 shows the accuracies for training at 32 kbit/s and 192 kbit/s and recognition using various output bit rates. The result shows that the accuracies are essentially the same for training and recognition of MPEG/Audio layer I files with bit rates above 32 kbit/s. Severe distortions are present when coding at 32 kbit/s and as expected, poor recognition results were obtained using models that were trained above 32 kbit/s.

TABLE 3

Training At One Bit Rate & Recognition At Other Bit Rates (Layer I)

| Training kbits/s | Recognition at kbit/s | | | | | |
|---|---|---|---|---|---|---|
| | 32 | 64 | 96 | 128 | 160 | 192 |
| 32 | 90.68% | 50.35% | 47.77% | 47.87% | 47.92% | 47.87% |
| 96 | 9.51% | 97.87% | 97.87% | 97.92% | 97.97% | 97.92% |
| 192 | 9.51% | 97.97% | 97.92% | 98.02% | 97.97% | 98.02% |

However, it is possible to train the HMM using files coded at 32 kbit/s and achieve good recognition for files coded at the same bit rate. Unfortunately, performance drops when recognizing files coded at higher bit rates as shown in a graph 80, in FIG. 6. In this graph, the squares indicate the accuracy where the training was at the higher output bit rate of 192 kbit/s, while the circles indicate the recognition accuracy for the case where the training was at the lower bit rate of 32 kbit/s. Here, the distortions in lower bit rate files were absorbed by the HMM models, but these distortions are not found in the higher bit rate files.

TABLE 4

Recognition Accuracy For 32 Kbit/S Training (Layer II)

| Train Kbit/s | Recognition at kbit/s | | | | | |
|---|---|---|---|---|---|---|
| | 32 | 64 | 96 | 128 | 160 | 192 |
| 32 | 99.26% | 99.21% | 99.26% | 99.31% | 99.31% | 99.31% |

Table 4 shows an improvement in performance by keeping everything the same except for coding the training and recognition sets using layer II. Here, training at 32 kbit/s did not degrade the recognition of files coded at higher bit rates. This is to be expected since layer II can compress more information at the same bit rate than layer I can.

Results from Interlayer Recognition

Recognition of one layer is not limited to the layer on which it was trained. The recognizer can be trained on layer I files and be used to recognize layer II files and vice versa. At an output bit rate of 96 kbit/s, the interlayer recognition accuracy is quite good. Given training and recognition at an appropriate bit rate, Table 5 shows that interlayer recognition is possible.

TABLE 5

Interlayer Recognition for Training & Recognition at 96 kbit/s

| Train | Recognize | Accuracy |
|---|---|---|
| Layer I | Layer I | 97.87% |
| Layer I | Layer II | 99.32% |
| Layer II | Layer I | 99.11% |
| Layer II | Layer II | 99.31% |

Recognition Results from Varying the Number of Subbands

For this subband experiment, the subbands that were used in creating the speech vectors are varied. For training, nine subbands are used, that is, subbands 0 to 8. The result of varying the subbands (i.e., so that there is a mismatch between the subbands used for training and for recognition) on recognition is shown in Table 6. Note the drop in accuracy if the subbands considered are from 0 to 9, i.e., when the mismatch occurs because more subbands were considered during recognition than in training.

TABLE 6

Accuracy Based on the Subbands Considered

| Subbands | Accuracy |
|---|---|
| 0 → 0 | 9.71% |
| 0 → 1 | 9.56% |
| 0 → 2 | 9.37% |
| 0 → 3 | 9.51% |
| 0 → 4 | 9.32% |
| 0 → 5 | 9.12% |
| 0 → 6 | 11.55% |
| 0 → 7 | 83.99% |

TABLE 6-continued

Accuracy Based on the Subbands Considered

| Subbands | Accuracy |
|---|---|
| 0 → 8 | 99.26% |
| 0 → 9 | 61.45% |

Discussion

The experiments have shown that the technique employed in the present invention for deriving speech features from only the subband signals of MPEG/Audio, combined with HMMs, can result in good performance. Training and recognition is possible using different output bit rates. In cases where there are distortion, the HMMs can be trained to absorb the distortions and still perform remarkably well. Interlayer recognition is possible so that training is not confined to one layer, thereby making the technique flexible. With better compression, layer II consistently produced better results than layer I in both training and recognition.

In this method, the choice of the subbands to be considered is important. As shown in Table 6, the subbands should be exactly the same for both training and recognition. For example, it is possible to use only subband 0 for both training and recognition. However, the speech vectors may not be sufficiently decorralated to produce reasonable accuracy. Also, for good recognition accuracy, the subband used should correspond to the range in which human speech is found. Therefore, once the appropriate subband has been determined, it is important to use it consistently for both training and recognition. to avoid the mismatch problem noted above.

A novel technique for speech recognition in the compressed domain of MPEG/Audio has been described above, and experiments have confirmed that the recognition performance of the present invention is as good as training and recognition in the uncompressed domain. The present invention provides a technique that is fast and is applicable to both layers I and II of MPEG/Audio. When this technique is combined with an HMM-based speech recognizer, distortions that are present in MPEG/Audio can be absorbed during training and still yield good performance during recognition of similarly distorted files. Another advantage of using HMMs is that a crude form of speaker independence can be achieved simply by using samples from different speakers during training.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A method for recognizing speech in a Motion Picture Experts Group (MPEG) file, comprising the steps of:
    (a) without decompressing the MPEG file, determining speech features of the MPEG file;
    (b) using the speech features, training a speech recognition model to recognize words in a different uncompressed MPEG file; and
    (c) using the speech recognition model, identifying words spoken in an audio portion of the different MPEG file without decompressing the different uncompressed MPEG file.

2. The method of claim 1, wherein the step of determining speech features comprises the step of determining speech features that are encoded in a plurality of layers of said MPEG file.

3. The method of claim 2, wherein the step of training under one layer of the MPEG file can be used to recognize a plurality of other layers in different uncompressed MPEG files.

4. The method of claim 1, wherein the step of determining speech features of the MPEG file comprises the steps of:
   (a) extracting a plurality of encoded subband samples of the MPEG file;
   (b) forming the plurality of encoded subband samples into a plurality of frames;
   (c) windowing the plurality of frames to counter edge effects;
   (d) computing a fast Fourier transform of each of the plurality of frames that were windowed, each frame including a plurality of encoded subband samples;
   (e) determining magnitudes for the plurality of encoded subband samples within a frame; and
   (f) forming a single frequency vector by concatenating the magnitudes of the plurality of framed encoded subband samples in the frame.

5. The method of claim 4, wherein the step of determining speech features of the MPEG file further comprises the step of processing the single frequency vector using a filterbank analysis to combine the framed encoded subband samples into a speech vector.

6. The method of claim 5, further comprising the steps of:
   (a) producing a plurality of speech vectors from the plurality of subband samples; and
   (b) using the plurality of speech vectors from the MPEG file to create speech feature data.

7. The method of claim 1, wherein the step of training a speech recognition model to recognize words in the different uncompressed MPEG file comprises the step of using the speech feature data to create the speech recognition model used to recognize the words in the different uncompressed MPEG file.

8. The method of claim 1, wherein the step of identifying words spoken in an audio portion of the different uncompressed MPEG file comprises the steps of:
   (a) identifying similar encoded subband samples using the speech recognition model to recognize the speech features of the different uncompressed MPEG file; and
   (b) producing an output indicating the words that were spoken in the audio portion of the different uncompressed MPEG file.

9. The method of claim 1, further comprising the step of enabling identification of a speaker of an audio portion of the different uncompressed MPEG file.

10. The method of claim 1, further comprising the step of extracting from the MPEG file a plurality of encoded subband samples sufficient in number to complete one frame, for each of a plurality of successive frames.

11. The method of claim 10, further comprising the step of applying a Hamming window to each frame of encoded subband samples to counter edge effects.

12. The method of claim 11, further comprising the step of applying a fast Fourier transform to each encoded subband sample in each frame, to produce a corresponding frequency domain sample.

13. The method of claim 12, further comprising the step of determining a magnitude of each frequency domain sample.

14. The method of claim 13, further comprising the step of concatenating a plurality of magnitudes determined for the frequency domain samples into each of a plurality of single frequency vectors.

15. The method of claim 14, further comprising the step of carrying out a filterbank analysis using a mel-warped, static cepstral, delta, and acceleration coefficients (MCDA) method, in which each single frequency vector is mel-warped into a mel-scale, by processing magnitudes of the frequency domain samples in the frequency vector with a triangular filter corresponding to the mel-scale, producing an output.

16. The method of claim 15, further comprising the step of computing a plurality of static cepstral coefficients from the output, using a discrete cosine transform.

17. The method of claim 16, further comprising the step of computing a plurality of delta coefficients from the static cepstral coefficients using a regression process.

18. The method of claim 17, further comprising the step of computing a plurality of acceleration coefficients from the delta coefficients using the regression process.

19. The method of claim 15, further comprising the step of generating a plurality of frames comprising a plurality of static cepstral, delta, and acceleration coefficients, to create a plurality of speech vectors.

20. The method of claim 1, further comprising the step of combining the speech features to form feature data.

21. The method of claim 20, further comprising the step of using the plurality of speech features for training and recognition using a Hidden Markov model (HMM) based speech recognizer.

22. The method of claim 21, further comprising the step of inputting the plurality of speech features into the HMM for both training and recognition.

23. The method of claim 22, further comprising the step of using the feature data to train a plurality of Hidden Markov models.

24. The method of claim 23, further comprising the step of using the trained Hidden Markov models to recognize speech features in a plurality of different uncompressed MPEG files, enabling modeling for at least one of a subword, a word, and a sentence level.

25. A method for enabling a speaker to be recognized in a Motion Picture Experts Group (MPEG) file, comprising the steps of:
   (a) without decompressing the MPEG file, determining speech features of the MPEG file;
   (b) using the speech features, training a speech recognition model; and
   (c) using the speech recognition model, enabling a speaker to be identified in an audio portion of a different MPEG file without decompressing the different uncompressed MPEG file.

26. A method for indexing a Motion Picture Experts Group (MPEG) file, comprising the steps of:
   (a) without decompressing the MPEG file, determining audio features of the MPEG file;
   (b) using the audio features, training an audio recognition model; and
   (c) using the audio recognition model, enabling indexing of a different MPEG file in regard to at least one of a content and a speaker, without decompressing the different uncompressed MPEG file, based upon an audio portion of the different uncompressed MPEG file.

* * * * *